US006776360B2

(12) United States Patent
Haruch et al.

(10) Patent No.: US 6,776,360 B2
(45) Date of Patent: Aug. 17, 2004

(54) SPRAY GUN WITH IMPROVED NEEDLE SHUT-OFF VALVE SEALING ARRANGEMENT

(75) Inventors: James Haruch, Naperville, IL (US); Gerald P. Ferrazza, Schaumburg, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 09/892,138

(22) Filed: Jun. 26, 2001

(65) Prior Publication Data

US 2002/0195505 A1 Dec. 26, 2002

(51) Int. Cl.$^{7}$ .......................... B05B 1/00; F02M 61/10; F16K 1/00; F16K 15/00; F16J 15/02

(52) U.S. Cl. ................. 239/591; 239/533.11; 239/526; 239/DIG. 4; 251/332; 277/630

(58) Field of Search ................................ 239/591, 407, 239/408, 290, 296, 590, 533.11, 525, 526, DIG. 4, 416.5, 418, 423, 424; 251/332; 277/630, 637, 910

(56) References Cited

U.S. PATENT DOCUMENTS 2,929,401 A * 3/1960 Cowan .................. 137/516.29
3,233,863 A * 2/1966 Bowen et al. .............. 251/210
4,014,510 A * 3/1977 Smith .......................... 251/63
4,834,338 A * 5/1989 Davis ......................... 251/171
5,123,436 A * 6/1992 Koechlein et al. ............ 137/12
5,344,078 A * 9/1994 Fritz et al. .................. 239/296
5,370,357 A * 12/1994 Jones ......................... 251/122
5,462,204 A * 10/1995 Finn ........................... 222/137
5,618,025 A * 4/1997 Barron et al. ............... 251/210
5,707,010 A * 1/1998 Manfre et al. ............. 239/296
5,878,993 A 3/1999 St. Germain
5,899,387 A * 5/1999 Haruch ....................... 239/296
5,989,344 A * 11/1999 Platsch ....................... 118/684
6,283,152 B1 9/2001 Corte, Jr. et al.

FOREIGN PATENT DOCUMENTS

| | | | |
|---|---|---|---|
| DE | 1152857 | B | 8/1963 |
| EP | 109268 | A | 5/1984 |
| EP | 116704 | A | 8/1984 |
| FR | 1351077 | A | 1/1964 |

* cited by examiner

*Primary Examiner*—Michael Mar
*Assistant Examiner*—Darren Gorman
(74) *Attorney, Agent, or Firm*—Leydig, Voit & Mayer, Ltd.

(57) ABSTRACT

A gun-like spray device having a spray nozzle assembly at the discharge end and a reciprocatably movable valve needle for controlling the liquid flow through the discharge nozzle assembly. The nozzle assembly includes an orifice member which defines a liquid discharge orifice and a rigid valve seat for centering and precisely locating the valve needle in a closed position. An annular resilient sealing member is secured within the orifice member for engaging and creating a liquid seal about the valve needle separate and apart from the rigid seat when the valve needle is in a closed position. The spray nozzle assembly may be used with spray devices having different sized valve needles and includes a first rigid valve seat downstream of the resilient sealing member for receiving a relatively small diameter valve needle and a second rigid valve seat upstream of the resilient sealing member for receiving a relatively large diameter valve needle.

24 Claims, 4 Drawing Sheets

SPRAY GUN WITH IMPROVED NEEDLE SHUT-OFF VALVE SEALING ARRANGEMENT

FIELD OF THE INVENTION

The present invention relates generally to spray nozzle assemblies, and more particularly, a to spray gun having a spray nozzle assembly at the discharge end and a reciprocatable valve needle for controlling liquid discharge from the spray nozzle assembly.

BACKGROUND OF THE INVENTION

Spray guns having reciprocatably operated needle shut-off valves are well known in the art, such as shown in U.S. Pat. No. 5,707,010 assigned to the same assignee as the present application. The spray nozzle assembly of such spray guns includes an orifice defining member or insert, referred to herein as an orifice member, that defines the discharge orifice and a tapered valve seat for a reciprocatable control valve needle disposed in the liquid flow passageway for controlling the liquid flow through the spray nozzle assembly. The valve needle and tapered valve seat of the orifice member make metal contact during shut off, which concentrically locates and stops the valve needle and shuts off the liquid flow through the orifice member.

It is common to operate the control valve needle in predetermined relatively high speed cyclic movement for obtaining the desired spray discharge. To achieve reliable flow control and complete shut off during each operating cycle, it is necessary that the discharge orifice, valve seat, and control needle be manufactured with precision tolerances. Even then, manufacturing of such nozzle assemblies can result in quality control problems and costly parts rejection and reworking. For example, it is necessary that a tapered downstream end of the control valve needle concentrically and properly mate with the tapered valve seat. Surface imperfections in either the valve needle or seat can cause leakage problems and necessitate disassembly of the nozzle, lapping and reworking of the tapered valve seat surface, and polishing of the needle. Quality control and tolerance problems are compounded by reason of the relatively small sizes of the orifice member and valve needles used in such spray guns. Proposals to make the valve seat of a compliant material to more readily accommodate manufacturing variations have not been acceptable since a compliant material will not precisely stop and concentrically orient the valve needle as required and will deform during usage, causing even greater shut off problems.

Further problems can occur with spray nozzle assemblies of existing spray guns during field replacement of the orifice members. Typically the orifice member periodically is replaced in the field by reason of wear or the need to change the orifice size. While such orifice members are designed for easy replacement without the necessity for disassembling and replacement of the valve needle, even small amounts of wear on the needle can result in incomplete valve shut-off with the new orifice member. This can again necessitate reworking or polishing of the valve seat or needle to achieve proper shut off. When a number of nozzle assemblies must be maintained, as is common in many manufacturing operations, this can be particularly costly and time consuming.

Still a further problem with field maintenance of existing spray nozzle assemblies is inventory, in terms of the number of different models and sizes of orifices members, that must be offered by a manufacturer and stocked by the user. For example, such spray nozzle assemblies commonly have different sized needle valves, i.e., typically either 0.093 inches or 0.125 inches in diameter, and in order to minimize manufacturing and inventory requirements, it is desirable that replacement orifice members be replaced in the field for use with the different sized shut-off needles.

OBJECTS AND SUMMARY OF THE INVENTION

It is an object of the present invention to provide a spray gun or like spray device having a spray nozzle assembly with an orifice member adapted for more reliable shut off.

Another object is to provide a spray nozzle assembly as characterized above which can be economically manufactured with improved quality control.

A further object is to provide a spray nozzle assembly of the above kind which precisely and concentrically locates the valve needle and provides a reliable liquid seal while accommodating small tolerance variations and surface imperfections in the valve seat and needle.

Still another object is to provide a spray nozzle assembly of the foregoing type in which the orifice member is adapted for reliable use in spray guns or the like which have different sized valve needles.

Yet another object is to provide an orifice member for spray nozzle assemblies of the above kind that facilitates reliable field installation and replacement.

Still a further object is to provide a spray nozzle assembly with an orifice member of a design which minimizes inventory requirements.

Other objects and advantages of the invention will become apparent upon reading the following detailed description and upon reference to the drawings, in which:

Figure 1:
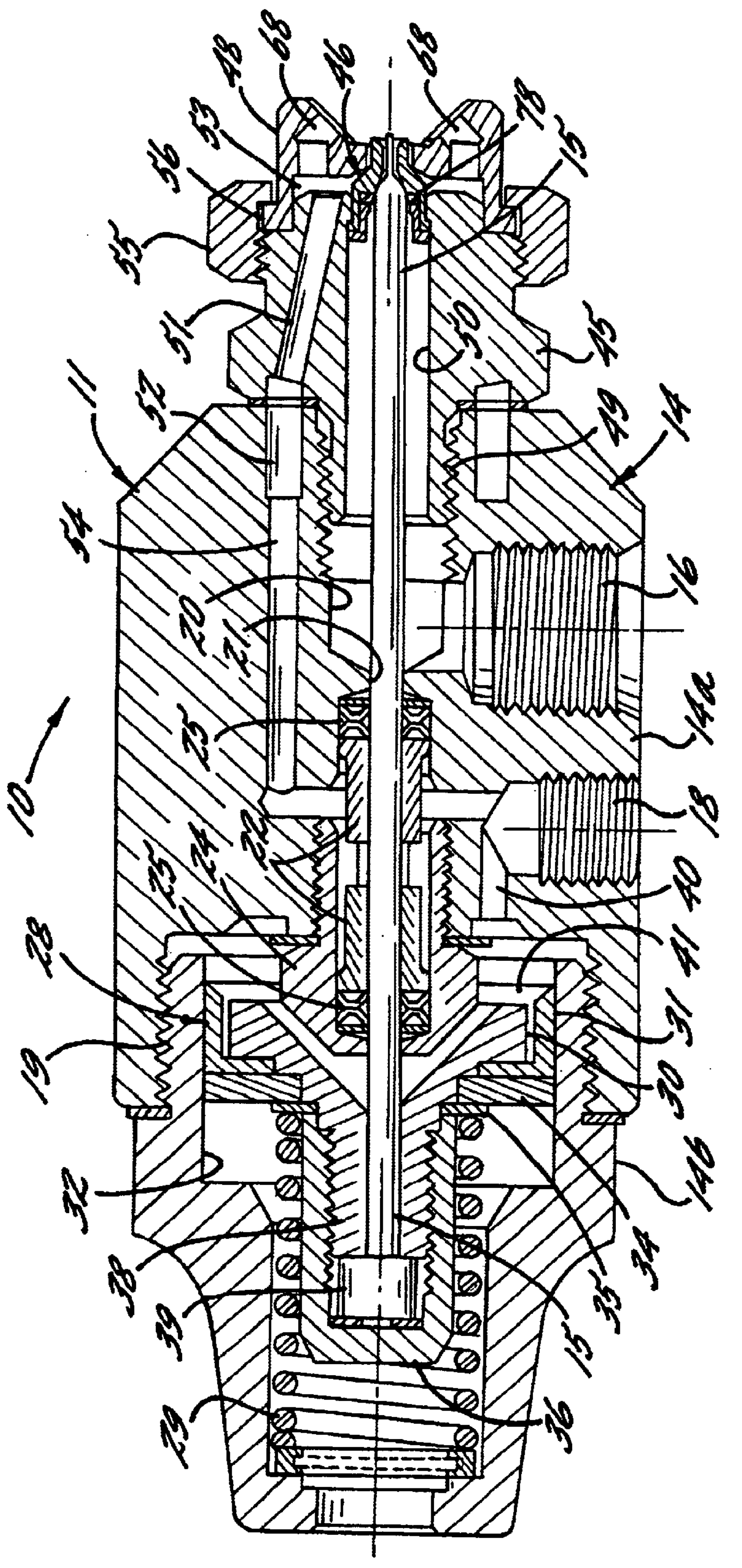
FIG. 1 a longitudinal section of an illustrative spray gun having a spray nozzle assembly in accordance with the present invention.

While the invention is susceptible of various modifications and alternative constructions, certain illustrative embodiments thereof has been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DESCRIPTION OF THE PREFERRED EMBODIMENT

Referring now more particularly to the drawings, there is shown an illustrative spray device 10 comprising a spray gun 11 having a spray nozzle assembly 12 in accordance with the present invention. The basic structure and mode of operation of the spray gun 11 are known in the art, for example, as shown in the aforementioned U.S. Pat. No. 5,707,010, the disclosure of which is incorporated herein by reference. The overall structure and mode of operation of the spray gun 11 should be understood to be illustrative of only one example of a spray device in which the nozzle assembly of the present invention may be used.

The illustrated spray gun 11 comprises a main housing 14 which axially supports a valve shut-off needle 15 and has a liquid inlet port 16 for connection to the liquid supply to be sprayed and an auxiliary fluid inlet port 18, such as for connecting to a pressurized air source, for assisting in atomization of the liquid to be sprayed and for effecting controlled axial movement of the valve needle 15 between on and off positions.

The housing 14 in this case includes generally cylindrical forward and rearward housing sections 14*a*, 14*b* which are joined to one another by a threaded inner connection 19. The forward housing section 14*a* is formed with the liquid and auxiliary fluid inlet ports 16, 18, with the liquid port 16 communicating with a central liquid passageway 20 in surrounding relation to the valve needle 15. The valve needle 15 is a long cylindrical element which extends co-axially through the housing 14 and into the nozzle assembly 12. The valve needle 15 extends through an opening 21 in the forward housing section 14*a* and is supported for reciprocating movement by an annular sleeve 22, which in turn is supported at one end within the housing section 14*a* and at another end by a packing nut 24 threadably mounted in the rearward end of the housing section 14*a*. Annular seals 25 are provided at opposite ends of the support sleeve 22.

For operating the valve needle 15, the rear housing section 14*b* carries a drive piston assembly 28 and a compression spring 29 which is confined between an outer side of the piston assembly 28 and an end wall or shoulder of the housing section 14*b*. The piston assembly 28 includes a piston 30 and a resilient annular cup-shaped sealing ring 31 which has sliding sealing engagement with the inner surface of a cylindrical bore 32 formed co-axially in the housing section 14*b*. The sealing ring 31 is held in position on the piston assembly by a pair of clamping rings or washers 34, 35 that are secured by a retainer cap 36 threaded onto a rear stem portion 38 of the piston 30. An enlarged end portion 39 of the valve needle 15 is connected to the piston 30 by being captured between the outer end of the piston stem portion 38 and the end wall of the retainer cap 36. Accordingly, the valve needle 15 is movable axially of the housing 14 in accordance with selective axial movement of the piston assembly 28.

Figure 2:
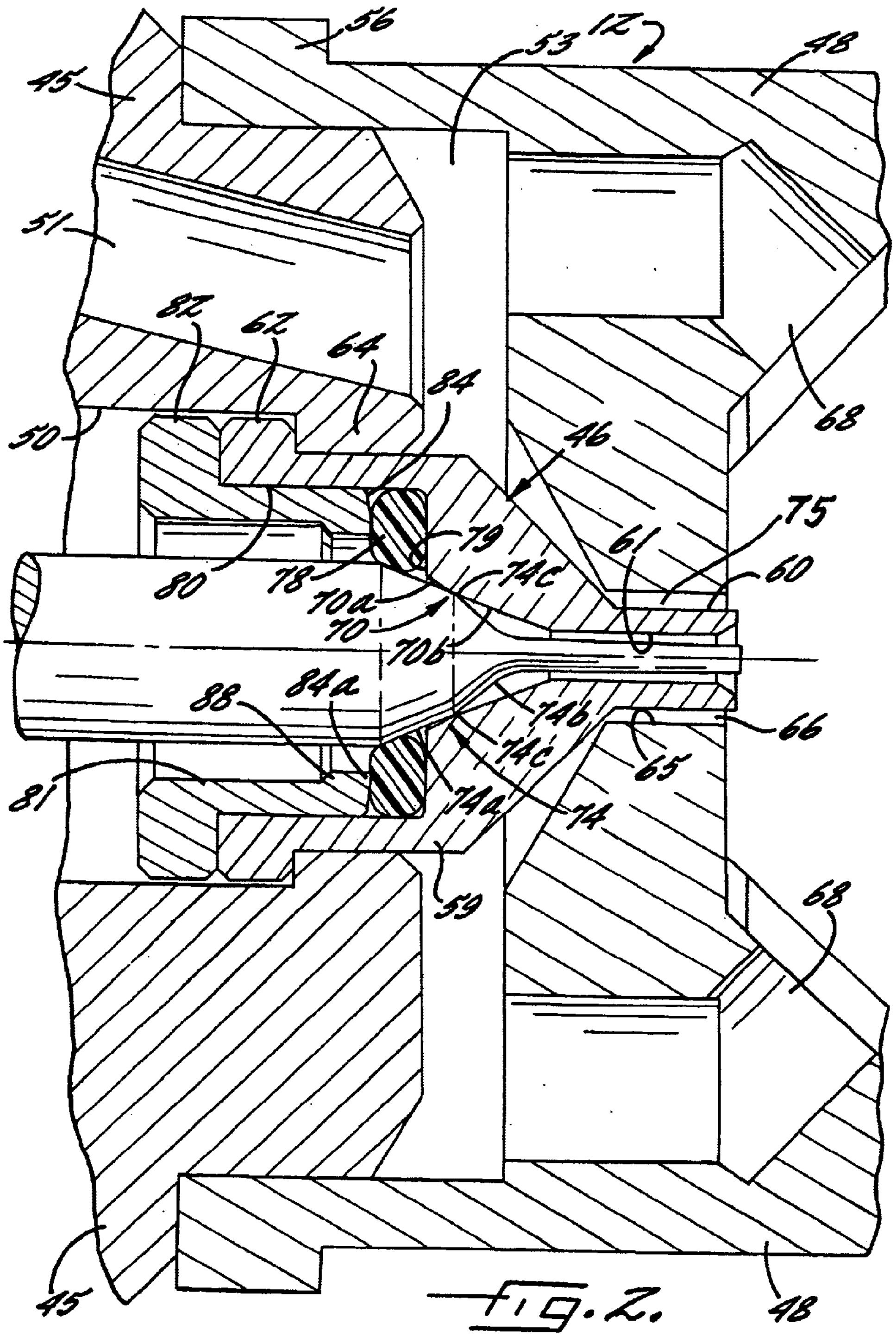
FIG. 2 is an enlarged fragmentary section of the spray nozzle assembly of the spray gun shown in FIG. 1 with the valve needle in a shut-off position.

The compression spring 29 biases the piston assembly 28, and hence the valve needle 15, forward to a fully seated, i.e. valve “closed” position as depicted in FIGS. 1 and 2. The valve needle 15 is moved axially in the opposite direction (to the left in FIG. 1) against the force of spring 29 by control drive air or other fluid supplied to inlet port 18 and through one or more connecting ports 40 into a cylinder chamber 41 adjacent a forward side of the moveable piston assembly 28. The supply of control fluid, e.g. compressed air, is controlled externally, such as by solenoid actuated valves, for controlled opening of the valve needle 15 to allow liquid to be discharged through the spray nozzle assembly 15. It will be appreciated from the foregoing that the valve needle 15 may be selectively operated between on and off positions, including operation in a high speed cyclic on-off mode, e.g. as rapid as 180 on-off cycles per minute.

The spray nozzle assembly 12, as depicted in FIGS. 1 and 2, comprises a generally cylindrical nozzle body 45, an orifice member or insert 46 concentrically mounted at the discharge end of the nozzle body 45, and an air cap 48 mounted in surrounding relation to a discharge end of the orifice member 46. The nozzle body 45 is affixed to the forward end of the spray gun housing 14 by a threaded stem 49 engageable in the liquid passageway 20. The nozzle body 45 includes a central axial liquid passageway 50 communicating with the housing liquid passageway 20 and one or more passageways 51 for communicating auxiliary fluid, such as pressurized air, from an annular manifold 52 which in turn is connected to the auxiliary fluid (i.e. air) inlet port 18 via a passageway 54 in the spray gun housing. The nozzle body air passageways 51 in turn communicate with a chamber or manifold 53 defined by the air cap 48 about the downstream end of the nozzle body 45. The air cap 48 has a close fit over the end of the nozzle body 45 and is retained by a nut 55 which engages an air cap flange 56 and is threaded over the end of the nozzle body 45.

The orifice member 46 in this case includes an orifice body 59 having a forwardly extending nose portion 60 which defines a liquid discharge orifice 61. The orifice member body 59 is press fit within the liquid passageway 50 of nozzle body 45 with an outer locating flange 62 in abutting relation to an inwardly directed annular flange 64 of the nozzle body 45. The nose portion 60 of the orifice member body 59 extends outwardly of the nozzle body 45 into and through a central opening 65 in the air cap 48. The nose portion 60 is slightly smaller in diameter than the opening 65 for defining an annular orifice 66 for discharging atomizing fluid, such as compressed air, parallel to and into liquid discharging from the discharge orifice 61. The air cap 48 in this case further includes a plurality of circumferentially spaced passages 68, also communicating with the manifold or air chamber 53 for further atomizing, forming, and directing the discharging spray.

To achieve optimum spray performance and to prevent leakage when the shut-off valve needle 15 is in a closed position, it is important that a seating end portion of the needle 15 and orifice member 46 are designed to achieve reliable liquid shut off. As indicated above, heretofore this has created both manufacturing and field service and replacement problems.

In accordance with the invention, the orifice member is designed to provide metal-to-metal seating engagement with the valve needle for precisely and concentrically locating the needle in a shut off position and further provide a resilient seal for the valve needle during shut off notwithstanding small tolerance variations or imperfections in the metal-to-metal seating. To this end, the illustrated orifice member 46 defines a first inwardly tapered valve seat 70 defined by a frustoconical surface 70*a* which converges in a downstream direction to an intersection with a second frustoconical surface 70*b*. By way of example, the first frustoconical surface 70*a* may be at an angle of about 30° to the central axis of the orifice member and the second frustoconical surface 70*b* may be at angle of about 20°.

The valve needle 15, as depicted in FIGS. 1 and 2, has a relatively small diameter, typically about 0.093 inches, having a seating end portion 74 defined by a first frustoconical surface 74*a* which intersects a second frustoconical surface 74*b* to define a relatively sharp or short radiused annular seating shoulder 74*c* therebetween for engagement with the first tapered valve seat 70 when the valve needle 15 is in a shut-off position. The valve needle seating shoulder 74*c* in this case engages the first frustoconical surface 70*a* of the valve seat 70 to concentrically and precisely locate the valve needle 15 in seated position with metal-to-metal contact and provide a circumferential seal between the needle 15 and the seating surface 70*a*. By way of one specific example, the surface 74*a* may be at angle of about 15° to the longitudinal axis of the needle and the surface 74*b* may be at angle of about 45° to such axis. In this case, the needle 15 further has an elongated nose portion 75 at the distal end of a diameter sized to extend through the discharge orifice 61 for clean out purposes when the valve needle 15 is seated. It will be understood by one skilled in the art that a variety of needle end portion configurations may be utilized to provide precise metal-to-metal engagement with the first valve seat 70.

In keeping with the invention, the orifice member 46 includes an annular resilient seal 78 effective for providing a fluid seal with the valve needle 15 separate from the seal established by the metal-to-metal seating contact of the valve needle 15 in the valve seat 70 during movement of the valve needle to a shut-off position for more reliable fluid sealing, notwithstanding wear or slight variations in the tolerances in the valve needle and seat. The annular resilient seal 78 in this case is in the form of an O-ring mounted adjacent an upstream end of the valve seat 70. The O-ring 78 in this instance is secured against an outwardly extending radial shoulder 79 defined by a counter bore 80 in an upstream end of the orifice member body 59. The O-ring 78 is forced against the shoulder 79 and retained in place by an annular retainer 81 press fit within the counter bore 80 of the orifice body 59 such that the O-ring is deformed radially inwardly for engagement with the valve needle 15 upon movement to a shut-off position. For ensuring that the resilient sealing member 78 is securely retained in position and for controlling radial deformation thereof during assembly, the retainer 81 has a radial flange 82 which limits inward press fitting movement of the retainer 81 into the counter bore 80 of the orifice member body 59 to a predetermined position. The retainer 81 further has a tapered or conical end surface 84 which defines a relatively sharp annular edge point 84*a* for securely retaining the O-ring 78.

It will be understood that upon movement of the valve needle 15 from a rearward open position to a forwardmost valve closing position the seating end portion of the valve needle, and in particular the annular sealing shoulder 74*c* will be guided into the valve seat 70 of the orifice member with metal-to-metal seating engagement which precisely and concentrically locates the valve needle 15 in the shut-off position, with the shoulder 74*c* in this case engaging the first frustoconical surface 70*a* of the valve seat 70. At the same time, the inward radial protruding portion of the resilient sealing member 78 will contact the tapered seating end of the valve needle and come into sealing engagement with the frustoconical surface 74*a* upstream of the metal-to-metal seating of the valve needle in the orifice member. It will be understood by one skilled in the art that the metal-to-metal seating engagement of the valve needle 15 with the valve seat 70 not only locates and centers the needle in the shut-off position, but establishes a first liquid seal. The resilient annular sealing member 78, provides a second liquid seal about the valve needle 15 during shut-off for more reliably preventing leakage notwithstanding tolerance variations or surface imperfections in the metal-to-metal seating of the valve needle in the orifice member. Hence, the redundant sealing contact of the valve needle and the orifice member not only provides more reliable valve shut off during each operating cycle, but accommodates surface variations and imperfections that might occur during original manufacture or field replacement of the orifice member.

Figure 3:
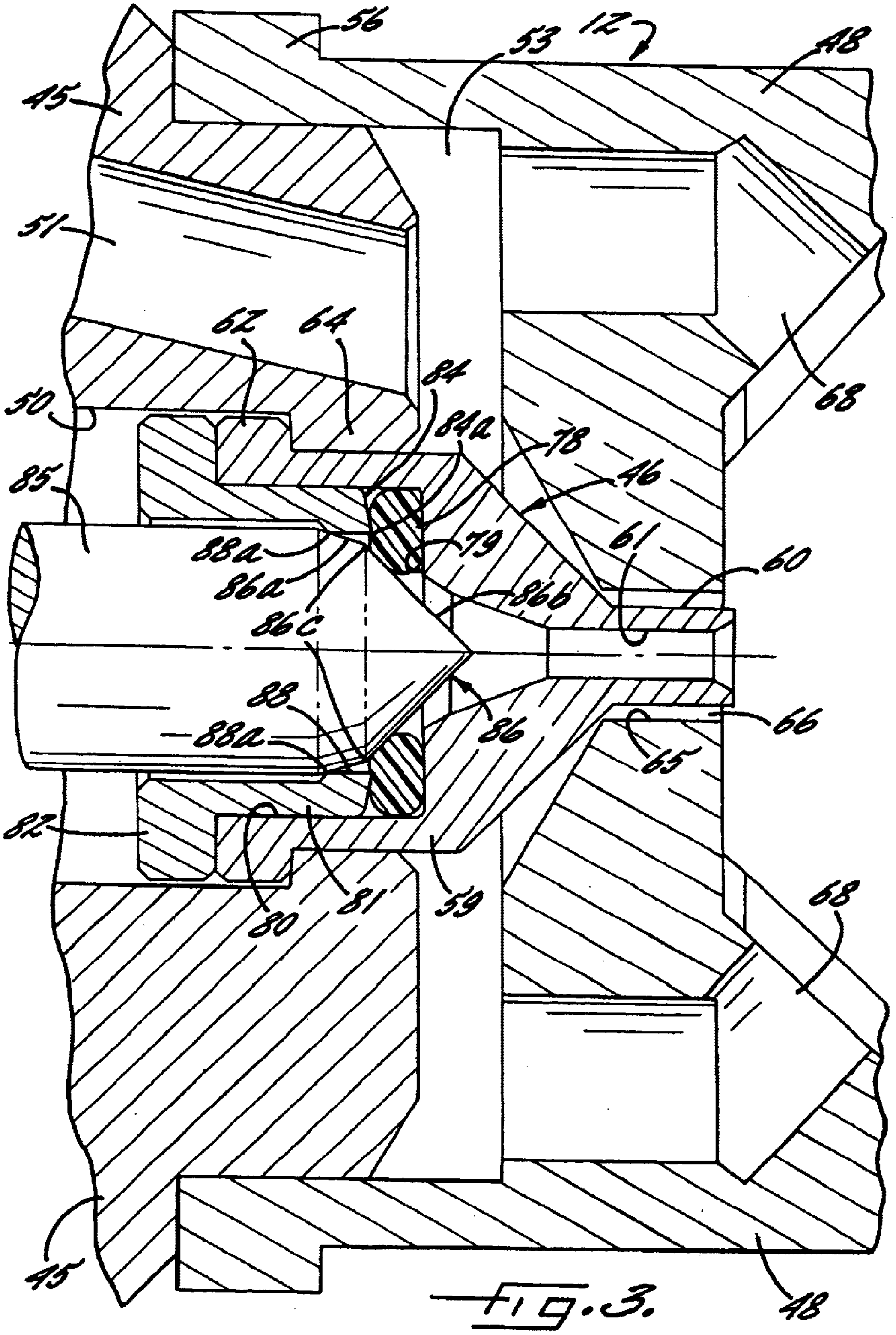
FIG. 3 is a vertical section of a spray gun and nozzle assembly similar to that shown in FIG. 1, but with an alternative form of valve needle.

In keeping with the invention, the orifice member 46 is adapted to be effectively used with spray guns having different sized valve needles 15. With reference to FIG. 3, by way of example, a spray gun 11 and nozzle assembly 12 identical to that described above are shown but with the spray gun 11 having a relatively larger sized valve needle 85, such as 0.125 inches in diameter. The valve needle 85 in this case has a seating end portion 86 defined by a first frustoconical 86*a* which intersects with a second conical surface 86*b* to define a seating shoulder 86*c* therebetween. By way of example, the surface 86*a* may be at an angle of about 15° to the axis of the needle and the surface 86*b* may be at an angle of about 45° to the axis. Again, it will be understood that the needle 85 could have other seating end portion configurations including those with a forwardly extending clean out portion.

In carrying out a further feature of the invention, the orifice member 46 is effective for guiding the seating end portion 86 of the valve needle 85 into metal-to-metal seating engagement at a point upstream of a secondary resilient seal defined by the resilient sealing member 78. To this end, the retainer ring 81 has an inwardly directed annular lip 88 at the forward end which defines a sealing shoulder 88*a* effective for guiding the forward seating end portion 86 of the valve needle 85 into precise concentric and seated engagement, in this instance with the metal-to-metal seating occurring between the shoulder 88 of retaining ring 81 and the frustoconical surface 86*a* of the valve needle. The O-ring 86 of the orifice member 46 in this case extends radially inward a greater distance than the sealing shoulder 88*a* of the retainer ring 81 and makes resilient sealing contact with the downstream conical surface 86*b* of the valve needle 85. Hence, similar to the embodiment of FIGS. 1 and 2, when the valve needle 85 is in a shut-off position the orifice member 46 establishes redundant metal-to-metal and resilient sealing engagement with the valve needle to provide a more reliable liquid seal while accommodating tolerances or surface imperfection in the metal-to-metal valve seat.

Figure 4:
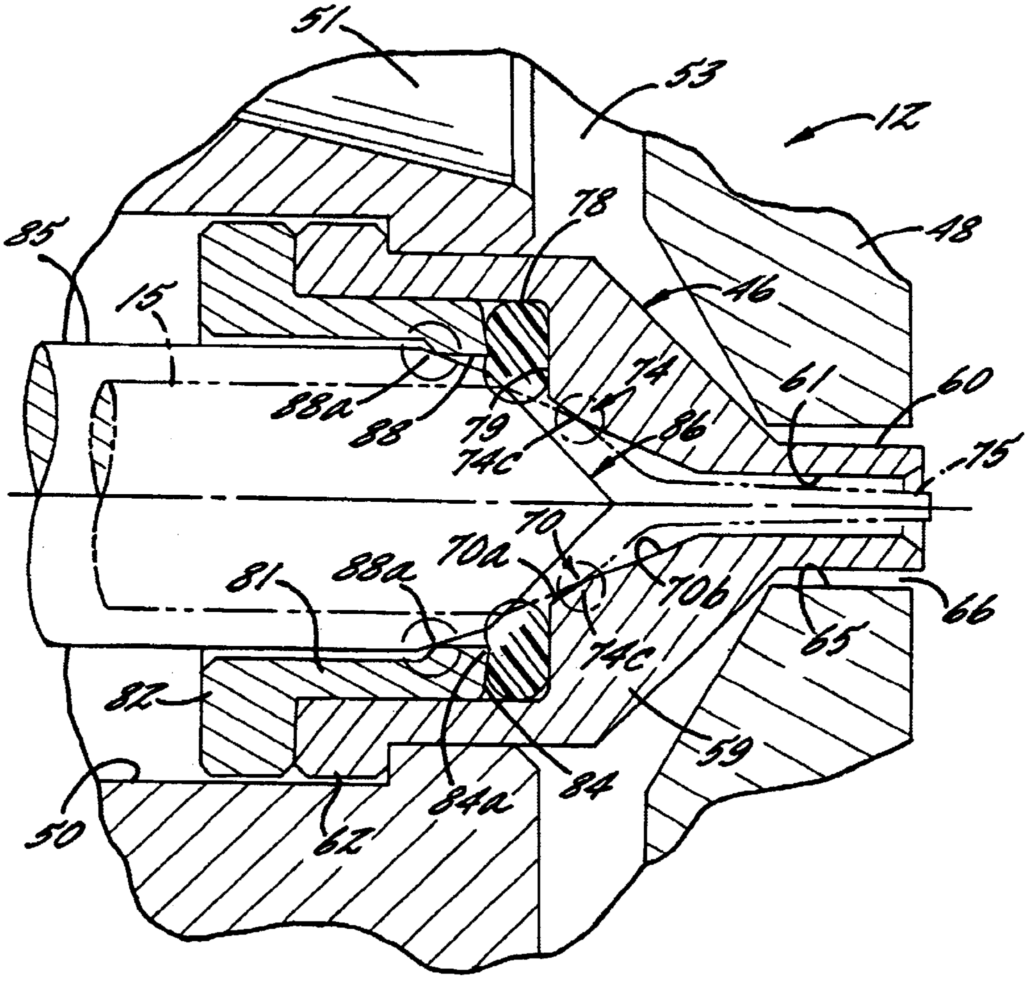
FIG. 4 is a diagrammatic depiction illustrating the spray nozzle assembly shown in FIG. 3 with the valve shut-off needle in solid lines and a relatively smaller sized valve shut-off needle as shown in FIG. 2 depicted in phantom lines.

It will further be appreciated by one skilled in the art that the orifice member 46 of the inventive nozzle assembly facilitates field service and replacement while minimizing inventory requirements. At the outset, the orifice member 46 may be effectively replaced in the field as required while accommodating tolerance variations or wear of the valve needle by virtue of the resilient seal. Moreover, since the orifice member may be used with different sized valve needles, as shown in FIGS. 2 and 3 and diagrammatically depicted in FIG. 4 (which is similar to FIG. 3 but with the valve needle 85 shown in phantom), inventory requirements may be substantially reduced. It is not necessary to maintain a separate orifice member for each size or style of valve needle. As will be understood by one skilled in the art, the unique location and mounting of the resilient sealing member 78 further enables the orifice member to be used with a variety of different sized and styled valve needles.

What is claimed is:

1. A spray device comprising a main body having a liquid passage for connection to a source of pressurized liquid to be sprayed, a spray nozzle affixed to said main body for directing liquid from said liquid passage in a predetermined spray pattern, a valve needle having a seating end portion and being selectively movable longitudinally in said body between a retracted open position for permitting liquid discharge through said nozzle and a closed position for preventing liquid discharge from said nozzle, said nozzle including an orifice body member which defines a liquid discharge orifice and a rigid valve seat in spaced upstream relation to said liquid discharge orifice for centering and precisely locating the seating portion of said valve needle when in a closed position, and a resilient O-ring sealing member mounted in longitudinally fixed relation within said orifice body member upstream of said rigid valve seat and having a circular cross section for resiliently engaging and creating a liquid seal about said valve needle seating portion when said valve needle is moved relative to said sealing member to a closed position.

2. The spray device of claim 1 in which said valve needle and orifice body member are made of metal, and said rigid valve seat and valve needle seating portion make metal-to-metal contact when said valve needle is in a closed position.

3. The spray device of claim 1 in which said orifice member defines an inwardly tapered entry section located between said rigid valve seat and said discharge orifice.

4. A spray device comprising a main body having a liquid passage for connection to a source of pressurized liquid to be sprayed, a spray nozzle having a liquid discharge orifice affixed to said main body for directing liquid from said liquid passage in a predetermined spray pattern, a valve needle having a seating end portion and being selectively movable in said body between a retracted open position for permitting liquid discharge through said nozzle and a closed position for preventing liquid discharge from said nozzle, said nozzle defining a valve seating area for receiving the seating portion of said valve needle when in a closed position, said nozzle having a resilient annular sealing member for resiliently engaging and creating a liquid seal about said valve needle seating portion when in a closed position, and said nozzle seating area including a first rigid valve seat downstream of said resilient sealing member and a second rigid valve seat upstream of said resilient sealing member.

5. The spray device of claim 4 in which said resilient sealing member extends radially outwardly a distance greater than said second rigid seat.

6. The spray device of claim 4 in which said nozzle includes an orifice body member within which said annular sealing member is received, an annular retainer positionable within an upstream end of said orifice body member for securing said resilient sealing member in predetermined relation to said orifice body member, said first rigid seat being defined by a tapered passageway in said orifice body member converging in a downstream direction and communicating with said discharge orifice, and said second rigid seat is defined by said retainer.

7. The spray device of claim 6 in which said first rigid valve seat is defined by a first frustoconical portion of said orifice body member which connects to a second frustoconical portion which in turn communicates with said discharge orifice.

8. The spray device of claim 7 in which said valve needle seating portion includes a first and second frustoconical portions which intersect to define a valve seat engaging shoulder.

9. The spray device of claim 4 in which said seating area includes a tapered passageway converging in a downstream direction and communicating with said liquid discharge orifice, said O-ring being affixed immediately upstream of said tapered valve seat, said orifice member being formed with an annular cavity within which said O-ring is disposed, and an annular retainer positioned within said cavity for fixing said O-ring in operative position.

10. The spray device of claim 4 in which said nozzle includes an orifice body member which defines said liquid discharge orifice and said first rigid valve seat, said resilient sealing member being disposed within said orifice body member, and an annular retainer securing said resilient sealing member in said orifice body member and defining said second rigid valve seat.

11. A spray device comprising a main body having a liquid passage for connection to a source of pressurized liquid to be sprayed, a spray nozzle affixed to said main body for directing liquid from said liquid passage in a predetermined spray pattern, a valve needle having a seating end portion and being selectively movable in said body between a retracted open position for permitting liquid discharge through said nozzle and a closed position for preventing liquid discharge from said nozzle, said nozzle defining a valve seat for receiving the seating portion of said valve needle when in a closed position, said nozzle including an orifice body member which defines a liquid discharge orifice and a rigid valve seat for centering and precisely locating said valve needle in a closed position, an O-ring sealing member for resiliently engaging and creating a liquid seal about said valve needle seating portion when in a closed position, said orifice body member having an upstream counter bore defining a radial ledge adjacent an upstream end of said rigid valve seat, and said resilient sealing member being fixedly mounted adjacent said radial ledge for engagement by said valve needle as incident to movement of the valve needle relative to said sealing member to a closed position.

12. The spray device of claim 11 in which said resilient sealing member is secured against said ledge by an annular retainer mounted within said orifice body member counter bore in surrounding relation to said valve needle.

13. The spray device of claim 12 in which said retainer has a tapered downstream end defining a relatively sharp annular shoulder for engaging and securing said resilient sealing member in mounted position.

14. A liquid spray gun comprising a main body having a liquid passage for connection to a source of pressurized liquid to be sprayed, a spray nozzle affixed to said main body for directing liquid from said liquid passage in a predetermined spray pattern, a valve needle having a seating end portion and being selectively movable in said body between a retracted open position for permitting liquid discharge through said nozzle and a closed position for preventing liquid discharge from said nozzle, said valve needle having a piston, said main body being formed with a chamber within which said piston is disposed and a fluid passageway communicating with said piston chamber whereby reciprocating movement of said valve needle can be controlled in response to communication of pressurized fluid to said passageway, said nozzle including an orifice body member which defines a liquid discharge orifice and a rigid valve seat in upstream spaced relation to said liquid discharge orifice for centering and precisely locating the seating portion of said valve needle when in a closed position, said orifice body member defining an inwardly tapered passage section disposed between said rigid valve seat and said discharge orifice, and an annular resilient sealing member being fixed within said orifice body member in upstream spaced relation to said discharge orifice for resiliently engaging and creating a liquid seal about said valve needle seating portion when said valve needle is moved relative to said sealing member to a closed position.

15. The spray device of claim 14 in which said valve needle seating portion has a tapered configuration.

16. A spray device comprising a main body having a liquid passage for connection to a source of pressurized liquid to be sprayed, a spray nozzle affixed to said main body for directing liquid from said liquid passage in a predetermined spray pattern, a valve needle having a tapered seating portion and being selectively longitudinally movable in said body between a retracted open position for permitting liquid discharge through said nozzle and a closed position for preventing liquid discharge from said nozzle, said nozzle including an orifice body member which defines a liquid discharge orifice and a rigid valve seat in upstream adjacent spaced relation to said liquid discharge orifice for centering and precisely locating the seating portion of said valve needle when in a closed position, said orifice body member defining a tapered passage section between said discharge orifice and said rigid valve seat, a resilient annular sealing member disposed within said orifice body member upstream of at least a portion of said tapered passage section, and an annular retainer positionable within an upstream end of said orifice body member for securing said resilient sealing member in predetermined longitudinally fixed position within said orifice body member such that said sealing member resiliently engages and creates a liquid seal about said valve needle tapered seating portion when said valve needle is moved relative to said sealing member to in a closed position.

17. The spray device of claim 16 in which said retainer engages and deforms said resilient sealing member radially inwardly with respect to said orifice body member.

18. The spray device of claim 16 in which said rigid valve seat is disposed upstream of said resilient sealing member.

19. A spray device comprising a main body having a liquid passage for connection to a source of pressurized liquid to be sprayed, a spray nozzle affixed to said main body for directing liquid from said liquid passage in a predetermined spray pattern, a valve needle having a tapered seating portion and being selectively movable in said body between a retracted open position for permitting liquid discharge through said nozzle and a closed position for preventing liquid discharge from said nozzle, said nozzle including an orifice body member which defines a liquid discharge orifice and a tapered longitudinally extending passage section upstream of said discharge orifice, a rigid valve seat in upstream adjacent relation to said liquid discharge orifice for centering and precisely locating the seating portion of said valve needle when in a closed position, and a resilient O-ring sealing member having a circular cross section mounted in a longitudinally fixed position within said orifice body member in upstream spaced relation to at least a portion of said tapered passage section for resiliently engaging and creating a liquid seal about said valve needle tapered seating portion when said valve needle is moved relative to said sealing member to in a closed position.

20. The spray device of claim 19 in which said O-ring sealing member is disposed in said orifice body member upstream of said rigid valve seat.

21. The spray device of claim 19 in which said rigid valve seat is defined by said tapered passage section.

22. The spray device of claim 19 in which said rigid valve seat is defined by an insert member positioned within said orifice body member.

23. A spray device comprising a main body having a liquid passage for connection to a source of pressurized liquid to be sprayed, a spray nozzle affixed to said main body for directing liquid from said liquid passage in a predetermined spray pattern, a valve needle having a seating end portion and being selectively movable in said body between a retracted open position for permitting liquid discharge through said nozzle and a closed position for preventing liquid discharge from said nozzle, said nozzle including an orifice body member which defines a liquid discharge orifice and a rigid valve seat in spaced upstream relation to said liquid discharge orifice for centering and precisely locating the seating portion of said valve needle when in a closed position, a resilient O-ring sealing member fixedly mounted in said body upstream of said rigid valve seat and having a circular cross section fixed within said orifice body member for resiliently engaging and creating a liquid seal about said valve needle seating portion when said valve needle is moved relative to said sealing member to a closed position, said main body having an air passage for connection to a pressurized air source, said nozzle including an air cap disposed in surrounding relation to said orifice body member, and said air cap defining at least one air passage for directing pressurized air for controlling and breaking down liquid discharged from said liquid orifice.

24. The spray device of claim 23 in which said air cap defines a first annular passage in surrounding relation to said liquid discharge orifice, and a plurality of circumferential air passages disposed radially outwardly of said annular passage.

* * * * *